United States Patent [19]

Johnson

[11] Patent Number: 4,458,273

[45] Date of Patent: Jul. 3, 1984

[54] MAGNETIC DISK DRIVE CONTROL APPARATUS AND METHOD

[75] Inventor: Jerome P. Johnson, Ogden, Utah

[73] Assignee: Iomega Corporation, Ogden, Utah

[21] Appl. No.: 258,400

[22] Filed: Apr. 28, 1981

[51] Int. Cl.³ .............................................. G11B 15/48
[52] U.S. Cl. ...................................... 360/74.1; 360/69
[58] Field of Search ...................... 360/99 X, 69–74.1; 318/696; 364/200, 900

[56] References Cited

U.S. PATENT DOCUMENTS

| | | | |
|---|---|---|---|
| 3,940,743 | 2/1976 | Fitzgerald | 364/200 |
| 4,005,483 | 1/1977 | Kuwano | 360/69 |
| 4,200,928 | 4/1980 | Allan et al. | 364/200 |
| 4,204,249 | 5/1980 | Dye et al. | 364/200 |
| 4,228,387 | 10/1980 | Brown | 318/696 |
| 4,233,666 | 11/1980 | Walberg et al. | 364/900 |
| 4,245,300 | 1/1981 | Kaufman et al. | 364/200 |
| 4,260,928 | 4/1980 | Allan et al. | 364/200 |

OTHER PUBLICATIONS

"Figure 9. Interface Connections", Shugart Company Model 801 disk drive.

Primary Examiner—Bernard Konick
Assistant Examiner—K. Wong
Attorney, Agent, or Firm—Woodcock, Washburn, Kurtz, Mackiewicz & Norris

[57] ABSTRACT

A microprocessor for control of a disk drive is shown which utilizes status signals passed back to the processor indicating the status of operation of the drive. A clock is provided for precise measurement of the elapsed time between consecutive read or write operations and for stopping the drive motor after a specified delay.

10 Claims, 2 Drawing Figures

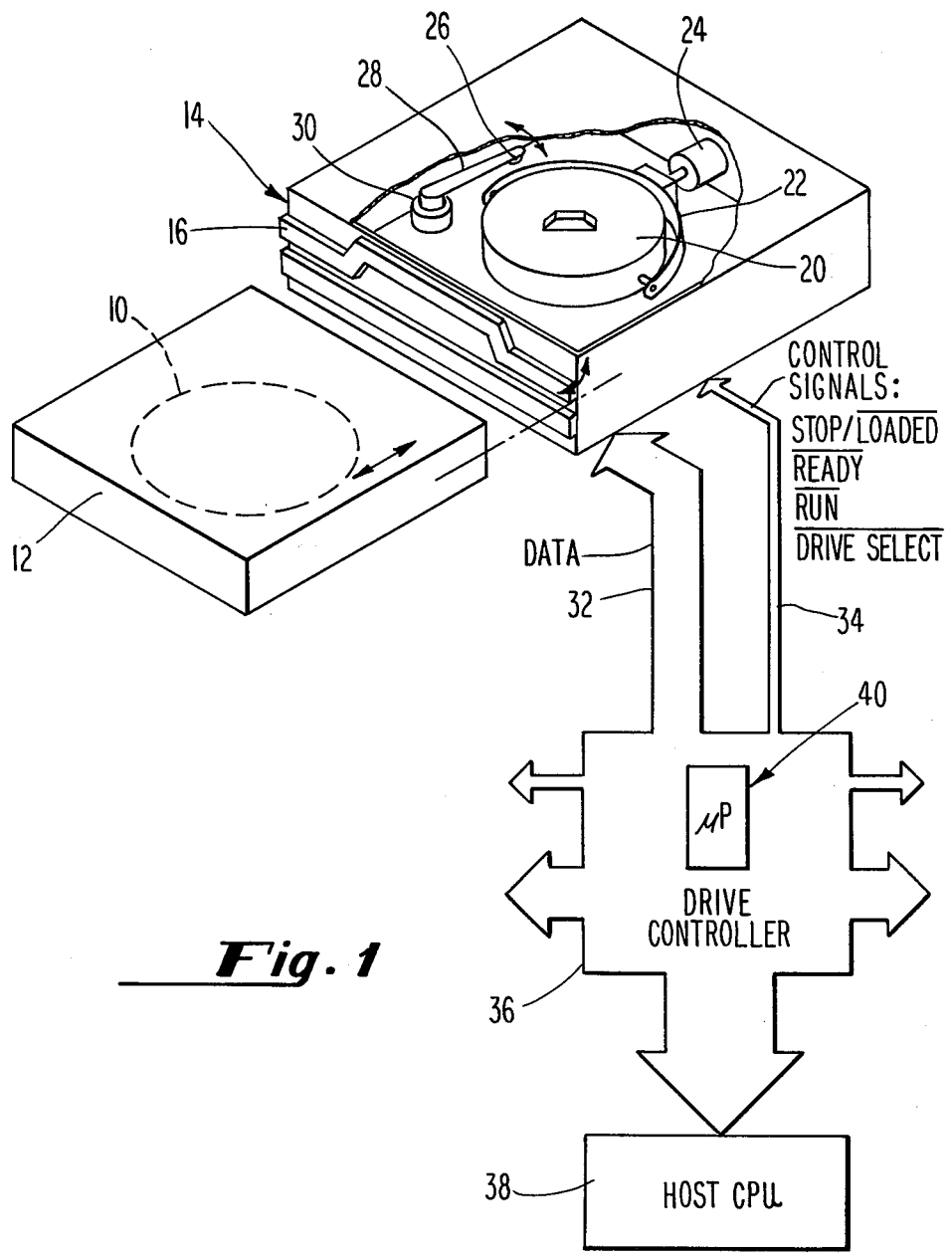
_Fig. 1_

MAGNETIC DISK DRIVE CONTROL APPARATUS AND METHOD

FIELD OF THE INVENTION

This invention relates to the control of magnetic disk drives. More particularly, it relates to a relatively simplified method of control of a plurality of magnetic disk drives by a single drive controller comprising a microprocessor.

BACKGROUND OF THE INVENTION

This invention relates to the control arrangement used by a microprocessor contained in a disk drive controller adapted to be connected to up to four magnetic disk drives for controlling the drives. In order that up to four drives can be controlled, it is important that signals be passed both to and from the drive by the controller. That is, the controller must signal a drive, for example, when to be prepared to read or write data, while the drive must be enabled to signal the controller that it is, in fact, ready.

In a particular embodiment of interest, the disk drive comprises means for driving a so-called "floppy" disk contained within a rigid box-like cartridge. When the floppy disk is inserted into the disk drive, the drive opens a portion of the box so that the disk can be connected to a drive motor and so that the read/write head can be juxtaposed thereto. Details of the arrangements used to enable this are discussed in copending applications, Ser. No. 256,320 filed Apr. 22, 1981 and Ser. No. 256,594 filed Apr. 22, 1981. The disks within cartridges are designed to be readily replaceable by the operator of the disk drive upon his seeking to employ varying ones of said disks and accordingly, it is important that a signal indicating the operator has completed replacement of the disk within a given drive be likewise passed to the controller.

In the embodiment with which the invention is particularly concerned, the floppy disk is juxtaposed in operation to a so-called Bernoulli plate. When the drive is energized and the floppy disk begins to spin, an air cushion is formed between it and the Bernoulli plate, such that the disk is substantially rigid at design speed. This permits the use of a "flying" or "Winchester" read/write head to be closely juxtaposed to the disk, which allows higher density reading and writing than in the floppy disk prior art. Since the head flies on an air bearing above the floppy disk surface, there is substantially no friction therebetween. However, if the head remains in a single position with respect to the disk for long periods of time it is possible that local conditions may cause the disk or head to suffer some damage. Accordingly, it would be desirable to provide means for stopping the motor upon the detection of a period of lack of read/write activity longer than some predetermined time. Prior art timing techniques, which would typically be incorporated in the drive, are not sufficient to perform this time measurement function with accuracy.

OBJECTS OF THE INVENTION

Accordingly, it is an object of the invention to provide means for control of up to four disk drives by a single disk controller unit.

It is a further object of the invention to provide such a control unit and arrangement whereby the control of said drives is relatively simplified.

It is yet another object of the invention to provide a control arrangement whereby control signals are passed from a controller to one of a plurality of disk drives and signals indicative of the state of operation of the drive are returned to the controller to confirm that its commands have been carried out.

A further object of the invention is to provide means for accurately measuring the time elapsed since a last previous read/write activity has been performed for stopping the motor of a disk drive to prevent damage to the disk or head.

Other aspects and objects of the invention will appear to those skilled in the art.

SUMMARY OF THE INVENTION

The above needs of the art and objects of the invention are satisfied by the present invention which comprises a control arrangement for the control of up to four disk drive units by a single disk controller. The disk controller comprises a microprocessor. Four lines identified respectively as DRIVE SELECT, RUN, READY and STOP/LOADED connect the microprocessor to each drive. The microprocessor is responsive to signals returned from the drive, both generated by the drive itself and in response to operator action. The microprocessor further comprises clock means for instructing the drive motor to stop upon the passage of a given length of time without read/write activity.

BRIEF DESCRIPTION OF THE DRAWINGS

The invention will be better understood if reference is made to the accompanying drawings, in which:

FIG. 1 shows an overview of the system of the invention; and

DESCRIPTION OF THE PREFERRED EMBODIMENTS

Figure 2:
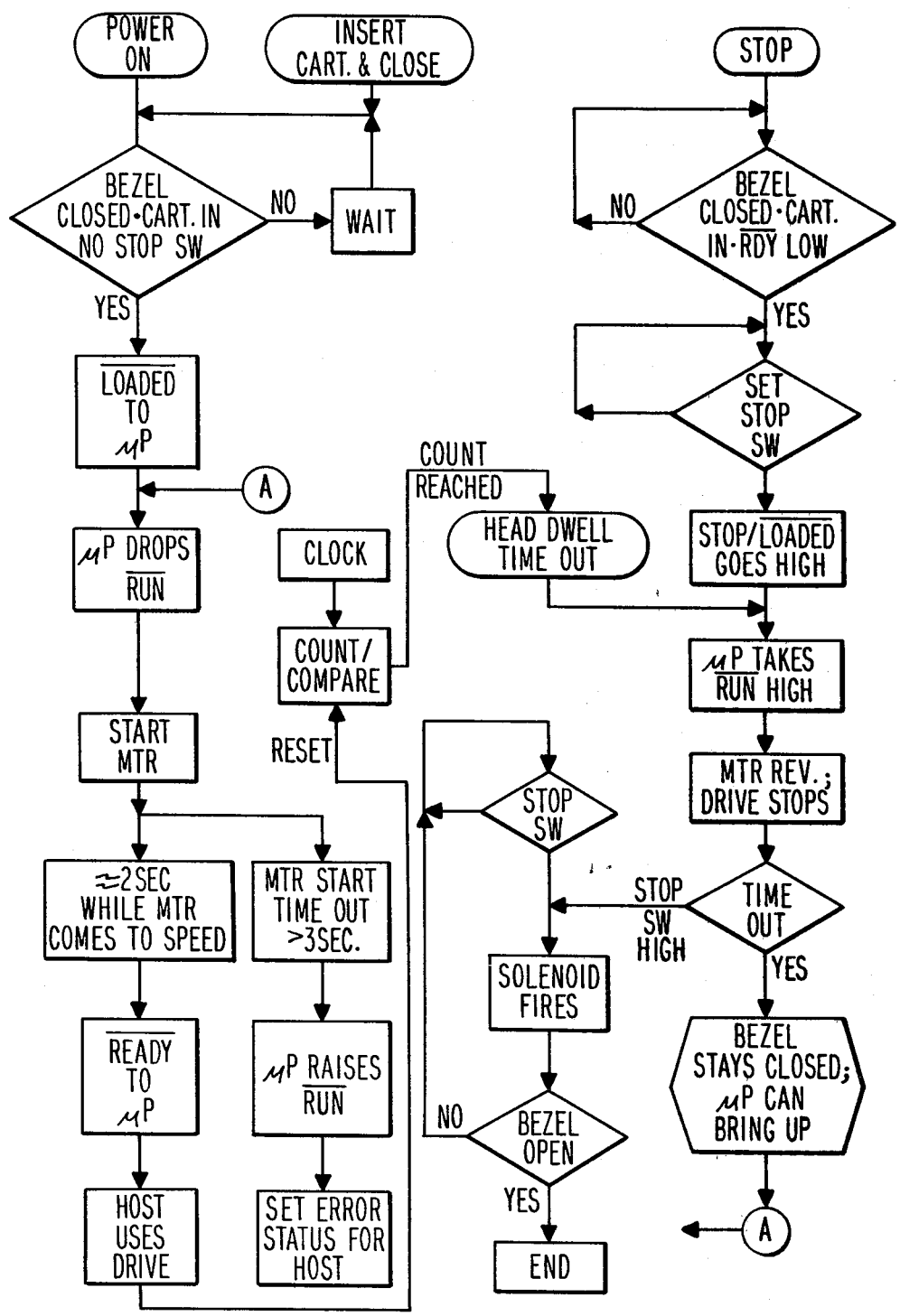
FIG. 2 shows a flow chart of the microprocessor controlled operating sequence.

FIG. 1 shows a schematic view of a disk drive according to the invention including the connections to the disk drive controller and to a host computer. A floppy disk 10 shown in phantom within a disk box 12 is arranged for insertion into the disk drive 14. A door or bezel 16 is provided which is opened only to accept insertion of the disk 10 within the box 12, so that the interiors of the drive 14 and of the box 12 remain clean and free of dust and the like, whereby efficient operation is insured. Within the drive 14 is contained a motor 20. In a preferred embodiment, the motor 20 has a magnetic hub for securing the floppy disk 10 and is pivotable into engagement with the box 12 containing the disk 10, the box 12 having once been inserted into the drive 14. In a preferred embodiment the motor 20 pivots on a yoke 22 for proper engagement with the floppy disk 10. Once the motor is engaged with the disk a solenoid 24 latches the yoke and motor into place, thus ensuring against disengagement.

The disk drive 14 also contains a read/write head 26 mounted on a servo arm 28 pivoted by the motor 30 to access various portion of the floppy disk 10 under the control of the disk drive control unit. The drive 14 may also contain sensors for indicating, for example, that a cartridge is present in the drive 14 and that the bezel 16 is properly closed.

The drive 14 is connected by data lines 32 and control lines 34 to a drive controller 36 which in turn is connected to a host computer or CPU 38. The drive controller comprises a microprocessor 40 which typically sends appropriate commands to the drive 14 and controls the flow of data through the controller from the host to the various disk drives connected to the controller. As noted, in the presently preferred embodiment, the drive controller can be connected to up to four disk drives. One of the control signals output by the microprocessor is hence a DRIVE SELECT signal. Other signals passed by the microprocessor to the disk drives include $\overline{\text{RUN}}$, relevant to the present invention, as well as signals for controlling actual position of the read/write head with respect to the disk for controlling the rotational speed of the drive motor 20, and the like. The drive 14 passes signals indicative that the drive either has a cartridge present or not as the case may be, STOP/$\overline{\text{LOADED}}$, and that the drive is up to speed and ready to read or write data, $\overline{\text{READY}}$. FIG. 2 shows how these signals are generated.

When the POWER ON signal is given, indicating that the drive is energized, the microprocessor first checks to see whether the sensors connected to the cartridge indicate that the bezel is closed, that the cartridge is in place and that the operator's stop switch has not been pressed. If the answers to all these questions are positive, the drive sends the $\overline{\text{LOADED}}$ signal to the microprocessor. The microprocessor then drops the $\overline{\text{RUN}}$ signal indicating that the drive is to start. The motor then starts. There is approximately a two second delay while the motor comes up to speed; if this occurs, as indicated by e.g., the locking-on of a phase locked loop circuit operating from position data provided by sensors incorporated in the spindle motor, the $\overline{\text{READY}}$ signal is sent to the microprocessor and the drive is ready to proceed. If the motor does not start within about three seconds, the microprocessor raises the $\overline{\text{RUN}}$ signal, thus preventing the drive from continuing these operations, and sends an error status signal to the host.

The STOP operation, initiated by the operator's pushing the stop button to cause the cartridge and the disk to be ejected from the drive is substantially the inverse of the beginning operation just described. The drive first considers whether the bezel is closed, the cartridge in place, and the $\overline{\text{READY}}$ signal low. If not, of course, then the drive is already stopped and pressing of the stop button need have no further effect. If yes, a STOP SWITCH signal is set high. The STOP/$\overline{\text{LOADED}}$ signal goes high which causes the microprocessor to take the $\overline{\text{RUN}}$ signal high—that is, the microprocessor then realizes the operator wants to remove the disk—and the motor is accordingly stopped. At this juncture there is a pause. Two possibilities are present now. If the microprocessor has stopped the motor because the operator has indicated he wishes to remove the disk, i.e., if STOP SWITCH is high, the solenoid releasing the motor from the disk fires, thus freeing the disk from the motor. If the bezel is open, the cartridge can then be removed. If not, the cartridge remains in place in the drive, though the motor is disconnected from the drive and STOP SWITCH remains high.

Returning now to the point in the diagram of FIG. 2 marked "Time Out", the step following this junction is determined by whether the motor was stopped because the operator wished to remove the cartridge, thus necessitating the STOP command, or because the motor stopped because no read/write operation was initiated within a predetermined length of time. This stop signal may be generated as follows, referring to the left side of FIG. 2: When the $\overline{\text{READY}}$ signal is passed to the microprocessor, a reset signal is passed to a counting circuit which counts clock pulses and compares them with a predetermined number indicative of the length of time through which the drive motor is permitted to run without performance of read or write operations. When this count is reached, a signal is passed to the "Head Dwell Time Out" node, which causes the microprocessor to take $\overline{\text{RUN}}$ high, and stop the motor. In this case, therefore, the bezel would stay closed, so that the microprocessor could bring the motor back up to speed if a read/write operation were thereafter initiated. That is, the process shown on the right of FIG. 2 would then exit to point A on the left side of FIG. 2, whereupon the start process would be substantially repeated, beginning with the microprocessor dropping the $\overline{\text{RUN}}$ signal so as to start the motor.

Summarizing, the interface between motor and microprocessor is three control lines, $\overline{\text{RUN}}$, $\overline{\text{READY}}$ and STOP/$\overline{\text{LOADED}}$. When the operator loads the drive with media, the STOP/$\overline{\text{LOADED}}$ line will go low signalling the drive is ready to start. The processor then brings down $\overline{\text{RUN}}$, telling the motor drive circuits to start the motor. When the motor has reached design speed, typically signaled by a servo loop locking to a reference, the motor circuit returns $\overline{\text{READY}}$, signalling that the disk is at speed and ready to read or write. Similarly, if the motor speed changes beyond the locking range of the servo loop the motor circuit will drop $\overline{\text{READY}}$, indicating to the processor that there is some difficulty. The processor keeps track of the elapsed time since any given drive in the string controlled by the processor was last used. When the Time Out node is reached, indicating that the motor should stop, the processor causes the $\overline{\text{RUN}}$ signal to go high. This causes the motor to stop while the drive remains loaded and prepared to restart. When the motor stops, $\overline{\text{READY}}$ will also go high. When the processor again needs to access the disk, $\overline{\text{RUN}}$ is brought down; the motor comes to speed and signals the processor with $\overline{\text{READY}}$. If, on the other hand, the operator wishes to stop the motor and remove the disk, he pushes the stop button which forces the STOP/$\overline{\text{LOADED}}$ line high. The same sequence is followed as in the case of the microprocessor causing the motor to stop, except the stop button being pushed additionally conditions the circuits to release the media from its place in the drive.

Those skilled in the art will recognize that there has been described a method of control of a disk drive which requires minimal signal interconnection while providing versatility of operation, particularly in regards to the several different types of STOP operation which are followed, the choice depending on whether the STOP operation is initiated by the operator's pressing a stop button, or by the microprocessor's determining that a long time has passed since the last accessing of the drive. Further, it will be appreciated that there are numerous modifications and improvements that can be made to the invention and that therefore the description of the invention given above should not considered as a limitation on its scope, which should only be as defined by the following claims.

I claim:

1. Apparatus for the control of a magnetic disk drive of the type wherein magnetic disks can be loaded into said drive by an operator, comprising:
   a motor for driving said disk;
   a read/write head for accessing portions of said disk; and
   a controller comprising processor means for controlling said motor and said drive, said controller being connected to said drive by interconnecting signal lines for exchange of commands and status information between said processor and said drive, said processor comprising clock means for measuring the interval between sequential access operations, for comparing said measured interval of time to a predetermined interval of time and for stopping said motor in absence of operator or host computer commands when an amount of time equal to or greater than said predetermined interval of time has passed without an access operation.

2. The apparatus of claim 1 wherein said interconnecting signal lines include a first line for alternatively indicating to said processor either that said drive is loaded, or that it has received an operator stop signal.

3. The apparatus of claim 1 wherein said interconnecting lines include a second line for said processor to command said drive to run.

4. The apparatus of claim 1 wherein said interconnecting lines include a third line for said drive to indicate to said processor that it is ready to read or write data, said signal being generated only when said drive motor has reached design speed.

5. The apparatus of claim 1 wherein said processor additionally comprises means for stopping said motor means when a predetermined time has passed since the last utilization of said drive by a host computer.

6. Method of operation of a disk drive under the control of a controller comprising microprocessor means, said drive comprising a motor for rotating a magnetic recording disk in proximity to a read/write head, wherein said microprocessor is connected to said drive by lines for carrying control and status signals back and forth between said microprocessor and said drive,
   wherein upon insertion of a magnetic disk into said drive, said drive sends a LOAD signal to said microprocessor over a first line indicating that it is loaded, wherein the negative of said LOAD signal on said first line is defined to indicate to said controller that an operator has directed that said drive stop upon conclusion of any pending operation.

7. The method of claim 6 wherein said microprocessor responds to said indication from said drive that it is loaded with a RUN signal, whereupon said drive motor is controlled to rotate said disk at a predetermined design speed.

8. The method of claim 7 further comprising the step of said drive indicating to said processor that it is ready to read or write data upon said motor's reaching said predetermined design speed.

9. The method of claim 8 comprising the additional step of said processor causing said motor to stop upon detection that a predetermined time has passed since the last utilization of said drive by a host computer, said processor restarting said motor upon signal from said host computer that it requires said drive.

10. In disk drive apparatus comprising a motor for rotating a magnetic disk in juxtaposition to a read/write head and microprocessor means for controlling the rotation of said disk and the motion of said head with respect to said disk;
   the improvement comprising said microprocessor further comprising clock means for precisely measuring the elapsed time between consecutive operations of said read/write head in response to commands received from a host computer and for discontinuing the running of said motor upon determination that the length of said elapsed time has exceeded a predetermined time.

* * * * *